United States Patent
Murakami et al.

(10) Patent No.: US 12,198,078 B2
(45) Date of Patent: Jan. 14, 2025

(54) SEAT MANAGEMENT DEVICE, SEAT MANAGEMENT METHOD, AND SEAT MANAGEMENT SYSTEM

(71) Applicant: TOYOTA JIDOSHA KABUSHIKI KAISHA, Toyota (JP)

(72) Inventors: Ryo Murakami, Susono (JP); Shinnosuke Shimokawa, Susono (JP); Junichi Mori, Nagakute (JP); Sokfan Yee, Toyota (JP); Kensaku Shibata, Toyota (JP); Yuta Maniwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/053,063

(22) Filed: Nov. 7, 2022

(65) Prior Publication Data
US 2023/0196213 A1 Jun. 22, 2023

(30) Foreign Application Priority Data
Dec. 16, 2021 (JP) .................. 2021-204403

(51) Int. Cl.
*G06Q 10/02* (2012.01)

(52) U.S. Cl.
CPC .................. *G06Q 10/02* (2013.01)

(58) Field of Classification Search
CPC .................. G06Q 10/02
See application file for complete search history.

(56) References Cited

U.S. PATENT DOCUMENTS

| | | | | |
|---|---|---|---|---|
| 6,543,849 B1 * | 4/2003 | Yamada | .......... | B60N 2/236 297/363 |
| 2002/0082878 A1 * | 6/2002 | Boies | .......... | G06Q 10/02 705/5 |
| 2019/0366959 A1 | 12/2019 | Friedman et al. | | |
| 2021/0245631 A1 * | 8/2021 | Ohno | .......... | B60N 2/14 |
| 2022/0024362 A1 * | 1/2022 | Halwax | .......... | B60N 2/5635 |

FOREIGN PATENT DOCUMENTS

| | | | |
|---|---|---|---|
| JP | 2011037423 A | | 2/2011 |
| JP | 2011153759 A | | 8/2011 |
| JP | 2020009422 A | | 1/2020 |
| WO | 2016/092687 A1 | | 6/2016 |
| WO | WO-2021065545 A1 * | | 4/2021 |

OTHER PUBLICATIONS

May, Kevin, "SunFlight—choose your airline seat based on what side the sun will be", PhocusWire, https://web.archive.org/web/20201129200025/https://www.phocuswire.com/SunFlight-choose-your-airline-seat-based-on-what-side-the-sun-will-be, Jun. 8, 2012 (Year: 2012).*

Ostrower, Jon, "The best spot on Earth to watch the eclipse is in the sky", CNN Money, https://money.cnn.com/2017/08/18/news/chasing-eclipse-in-the-sky/index.html, Aug. 18, 2017, retrieved Oct. 18, 2024 (Year: 2017).*

* cited by examiner

*Primary Examiner* — George Chen
(74) *Attorney, Agent, or Firm* — Dickinson Wright, PLLC (57) ABSTRACT

The seat management device includes a receiving unit for receiving a request regarding the characteristics of the seats of the mobile body in which the passengers can ride on each other, and a seat assigning unit for assigning a seat to the passengers for each region in the room of the mobile body on the basis of the request, to assign the passengers in which the request is common to the same region. The request is transmitted from a passenger terminal.

6 Claims, 6 Drawing Sheets

SEAT MANAGEMENT DEVICE, SEAT MANAGEMENT METHOD, AND SEAT MANAGEMENT SYSTEM

CROSS-REFERENCE TO RELATED APPLICATION

This application claims priority to Japanese Patent Application No. 2021-204403 filed on Dec. 16, 2021, incorporated herein by reference in its entirety.

BACKGROUND

1. Technical Field

The present disclosure relates to a seat management device, a seat management method, and a seat management system.

2. Description of Related Art

In a system and a method for vehicle sharing, it is known to identify a vehicle from one of ride-share providers based on a user request, retrieve one or more settings associated with one or more systems of the identified vehicle from the server, identify a system setting of the identified vehicle based on at least one physical characteristic of the user when the system setting is not stored in the server, and perform one or more settings on the identified vehicle (for example, Japanese Unexamined Patent Application Publication No. JP 2020-9422 (JP 2020-9422 A)).

SUMMARY

For example, in shared vehicles such as route buses and long-distance buses, the desired boarding environment is different for each individual passenger. The technology described in JP 2020-9422 A specifies the setting of the system of the vehicle in the shared car. There is room for improvement from the viewpoint of achieving the request on the characteristics of the seats of individual passengers in the shared vehicle.

The present disclosure provides a seat management device, a seat management method, and a seat management system capable of achieving a request regarding the characteristics of the seats of individual passengers in a mobile body that the passengers can board with other passengers.

The gist of the present disclosure is as follows.

(1) A seat management device includes: a receiving unit that receives a request regarding a characteristic of a seat of a mobile body that a passenger is able to board with other passengers, the request being transmitted from a terminal of the passenger; and a seat assigning unit that assigns the seat to each of the passengers for each of regions in a cabin of the mobile body based on the request, and assigns the passengers who make the requests in common to the same region.

(2) The seat management device according to the above (1) further includes a seat information transmitting unit that transmits information regarding the assigned seat to the terminal of the passenger or the mobile body.

(3) The seat management device according to the above (2) further includes a display information generating unit that generates display information showing an assignment of the seat for each of the regions.
The seat information transmitting unit transmits the display information.

(4) In the seat management device according to any one of above (1) to (3), the characteristic of the seat includes at least one of a temperature around the seat, a silence, a vibration, a brightness or a color of a light, a brightness or a color of a display device provided for the seat, sunniness, and an odor.

(5) The seat management device according to any one of above (1) to (4) further includes a control command transmitting unit that transmits, to the mobile body, a control command for controlling the characteristic of the seat for each of the regions in response to the request.

(6) In the seat management device according to above (5), the control command includes a control command for controlling an air conditioner, a lighting device, an audio output device, a display device, an odor generating device, or a reclining device of the seat provided in the mobile body.

(7) The seat management device according to any one of above (1) to (3) further includes a solar radiation estimating unit that estimates a direction of solar radiation with respect to the mobile body from an operation route and an operation time of the mobile body. The seat assigning unit assigns the seat to the passenger based on the request regarding sunniness of the seat and the direction of the solar radiation with respect to the mobile body that is estimated by the solar radiation estimating unit.

(8) A seat management method includes: a step of receiving a request regarding a characteristic of a seat of a mobile body that a passenger is able to board with other passengers, the request being transmitted from a terminal of the passenger; and a step of assigning the seat to each of the passengers for each of regions in a cabin of the mobile body based on the request, and assigning the passengers who make the requests in common to the same region.

(9) A seat management system in which a terminal of a passenger and a seat management device are communicably connected to each other includes: the seat management device including a receiving unit that receives a request regarding a characteristic of a seat of a mobile body that a passenger is able to board with other passengers, the request being transmitted from the terminal, a seat assigning unit that assigns the seat to each of the passengers for each of regions in a cabin of the mobile body based on the request, and assigns the passengers who make the requests in common to the same region, and a seat information transmitting unit that transmits information regarding the assigned seat to the terminal; and the terminal provided with a receiving unit that receives the information regarding the assigned seat.

According to the present disclosure, there is provided a seat management device, a seat management method, and a seat management system capable of achieving a request regarding the characteristics of the seats of individual passengers in a mobile body that a passenger can board with other passengers.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, several embodiments according to the present disclosure will be described with reference to the drawings. However, these descriptions are intended to be merely illustrative of preferred embodiments of the present disclosure. In other words, these descriptions are not intended to limit the present disclosure to such specific embodiments. In the following description, similar components are given the same reference numbers.

Figure 1:
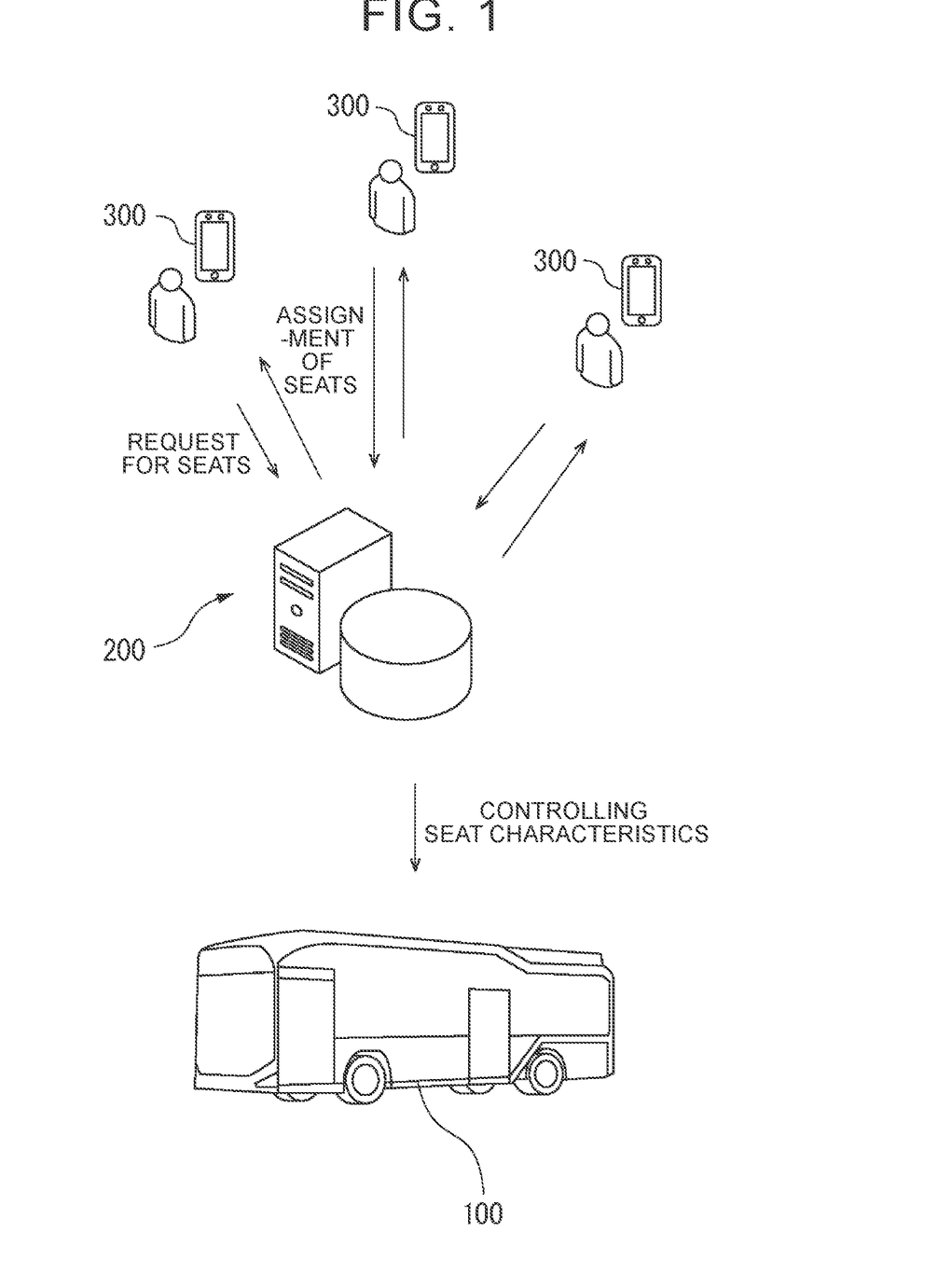
FIG. 1 is a schematic diagram illustrating a configuration of a seat management system according to an embodiment of the present disclosure.

FIG. 1 is a schematic diagram illustrating a configuration of a seat management system 1000 according to an embodiment of the present disclosure. The seat management system 1000 includes a mobile body 100, a server 200, and a passenger terminal 300. The mobile body 100, the server 200, and the user terminal 300 are communicably connected to each other via a communication network such as the Internet. The mobile body 100, the server 200, and the user terminal 300 may be connected via wireless communication such as WiFi, a wireless network of a mobile phone network such as long term evolution (LTE), LTE-Advance, fourth generation (4G), and fifth generation (5G), a dedicated network such as virtual private network (VPN), and a network such as local area network (LAN).

The mobile body 100 is a vehicle such as an automobile that travels on the road. The mobile body 100 is a vehicle that allows passengers to ride on each other. In the present embodiment, a long-distance bus that travels on an expressway or the like is exemplified as the mobile body 100. Note that the mobile body 100 is not limited to a long-distance bus, and the mobile body 100 may be a route bus used by a passenger during commuting or school commuting, for example. The mobile body 100 may be an autonomous driving vehicle.

When a passenger uses a long-distance bus, a comfortable environment is different for each passenger. Therefore, there are various demands regarding the characteristics of the passenger's seat. For example, hot people have a desire to sit in a cool seat. There is a desire for people with cold weather to sit in a warm-up seat. There are also requests for people who want to read or fall asleep to sit in quiet seats. On the other hand, some passengers want to talk in a car.

The seat management system 1000 of this embodiment receives a request regarding the characteristics of the seat from the individual passengers before the passengers ride on the mobile body 100. Then, the seat management system 1000 optimally assigns the seats to be seated by the individual passengers according to the requests of the individual passengers. The seat management system 1000 controls the characteristics of the seats according to the needs of individual passengers. This allows the individual passengers to sit on the desired seats. Therefore, comfortable movement according to the preference of each passenger can be realized, and an unsatisfactory experience by the mobile body can be eliminated.

Figure 2:
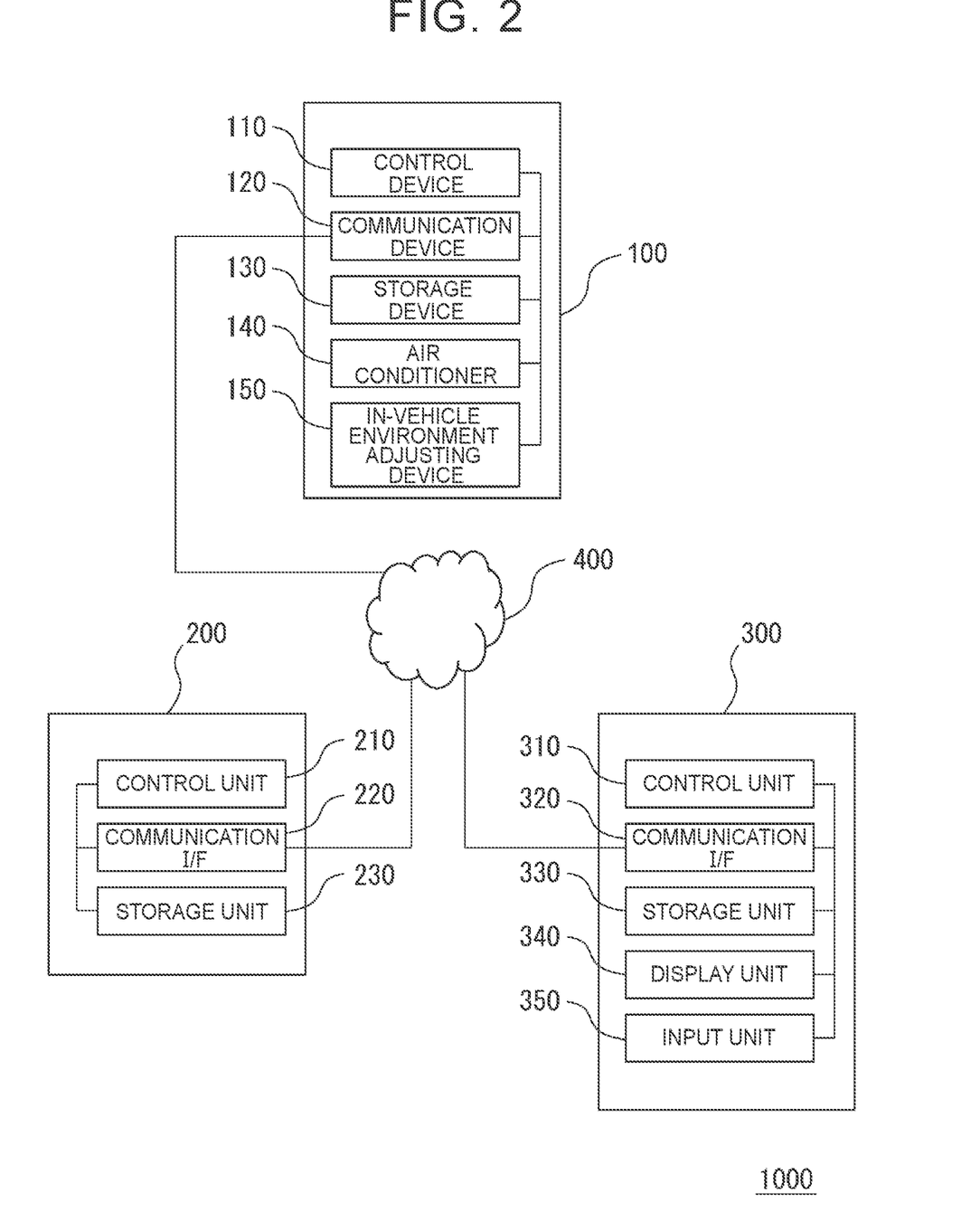
FIG. 2 is a block diagram showing a hardware configuration of the mobile body, the server, and the user terminal.

FIG. 2 is a block diagram showing a hardware configuration of the mobile body 100, the server 200, and the user terminal 300. Here, a case where the terminal 300 is configured from a smartphone is exemplified. However, the terminal 300 may be constituted by an electronic device such as a personal computer (PC) or a tablet terminal. In the example illustrated in FIG. 2, the mobile body 100, the server 200, and the terminal 300 are communicably connected via a communication network 400.

The mobile body 100 includes a control device 110, a communication device 120, a storage device 130, an air conditioner 140, and an in-vehicle environment adjusting device 150. Each of the control device 110, the communication device 120, the storage device 130, the air conditioner 140, and the in-vehicle environment adjusting device 150 is communicably connected via an in-vehicle network compliant with standards such as a controller area network (Controller Area Network (CAN)) and Ethernet (Ethernet).

The control device 110 of the mobile body 100 includes a processor. The processor has one or more Central Processing Unit (CPUs) and its peripheral circuitry. The processor may further include other arithmetic circuits such as a logical operation unit, a numerical operation unit, or a graphic processing unit. The control device 110 provides functions that meet a predetermined purpose by executing a computer program executably expanded in a work area of the storage device 130.

The communication device 120 of the mobile body 100 is a communication interface with the communication network 400. Communication device 120 includes, for example, an antenna, and a signal processing circuit. The signal processing circuitry performs various processing related to wireless communication, such as modulation and demodulation of the wireless signal. For example, the communication device 120 receives a downlink radio signal from a radio base station connected to the communication network 400. In addition, the communication device 120 transmits an uplink radio signal to the radio base station. The communication device 120 extracts a signal transmitted from the server 200 to the mobile body 100 from the received downlink radio signal, and transmits the signal to the control device 110. The communication device 120 generates an uplink radio signal and transmits the radio signal. The uplink radio signal includes a signal received from the control device 110 and transmitted to the server 200.

The storage device 130 of the mobile body 100 has, for example, a volatile semiconductor memory and a non-volatile semiconductor memory. The storage device 130, display information received from the server 200, such as a control command is stored.

Air conditioner 140 of the mobile body 100 is a device for adjusting the temperature of the vehicle cabin. Air conditioner 140 can adjust the temperature for each region in the vehicle cabin. The air conditioner 140 is controlled by the control device 110 based on a control command received from the server 200. Air conditioner 140 adjusts the temperature for each region in the vehicle cabin.

The in-vehicle environment adjusting device 150 of the mobile body 100 includes a lighting device, an audio output device, a display (display device), an odor generating device, a reclining device of the seat, and the like. The mobile body 100 adjusts the interior environment, such as the brightness of the lighting in the vehicle cabin, the color of the lighting, the type and volume of the sound, the brightness and color tone of the display, the odor, the angle of the seat backrest, and the like. The in-vehicle environment adjusting device 150 can adjust the vehicle interior environment for each region of the vehicle cabin. The in-vehicle environment adjusting device 150 is controlled by the control device 110 based on a control command received from the server 200. The in-vehicle environment adjusting device 150 adjusts the vehicle interior environment for each region of the vehicle cabin.

The display of the in-vehicle environment adjusting device 150 is composed of, for example, a liquid crystal display (LCD). Displays are provided in individual seats. The display displays, for example, information regarding seats assigned to passengers. Specifically, the display displays display information generated by the display information generating unit 210*d* of the control unit 210 of the server 200, which will be described later. The display may display a variety of information in addition to information about the seat.

The server 200 includes a control unit 210 as one mode of the seat management device, a communication I/F 220, and a storage unit 230. The control unit 210 of the server 200 is composed of a processor, as in the control device 110 of the mobile body 100. The communication I/F 220 of the server 200 includes a communication module connected to the communication network 400. For example, the communication I/F 220 may include a communication module that corresponds to the wired Local Area Network (LAN) standard. The server 200 is connected to the communication network 400 via the communication I/F 220.

The storage unit 230 of the server 200 has, for example, a volatile semiconductor memory and a non-volatile semiconductor memory. The storage unit 230 stores map information of a range including an operation route, an operation time, and an operation route of the mobile body 100.

The passenger terminal 300 includes a control unit 310, a communication I/F 320, a storage unit 330, a display unit 340, and an input unit 350. The control unit 310 of the terminal 300 includes a processor, similarly to the control unit 210 of the server 200.

The communication I/F 320 of the terminal 300 is configured similarly to the communication device 120 of the mobile body 100. The storage unit 330 of the terminal 300 has, for example, a volatile semiconductor memory and a non-volatile semiconductor memory. The display unit 340 of the terminal 300 is composed of, for example, a liquid crystal display (LCD). The display unit 340 displays various types of information. The input unit 350 of the terminal 300 includes, for example, a touch sensor, a keyboard, and the like. Information corresponding to the operation of the passenger is input to the input unit 350. When the input unit 350 is composed of a touch sensor, the display unit 340 and the input unit 350 may be configured as an integrated touch panel.

Figure 3:
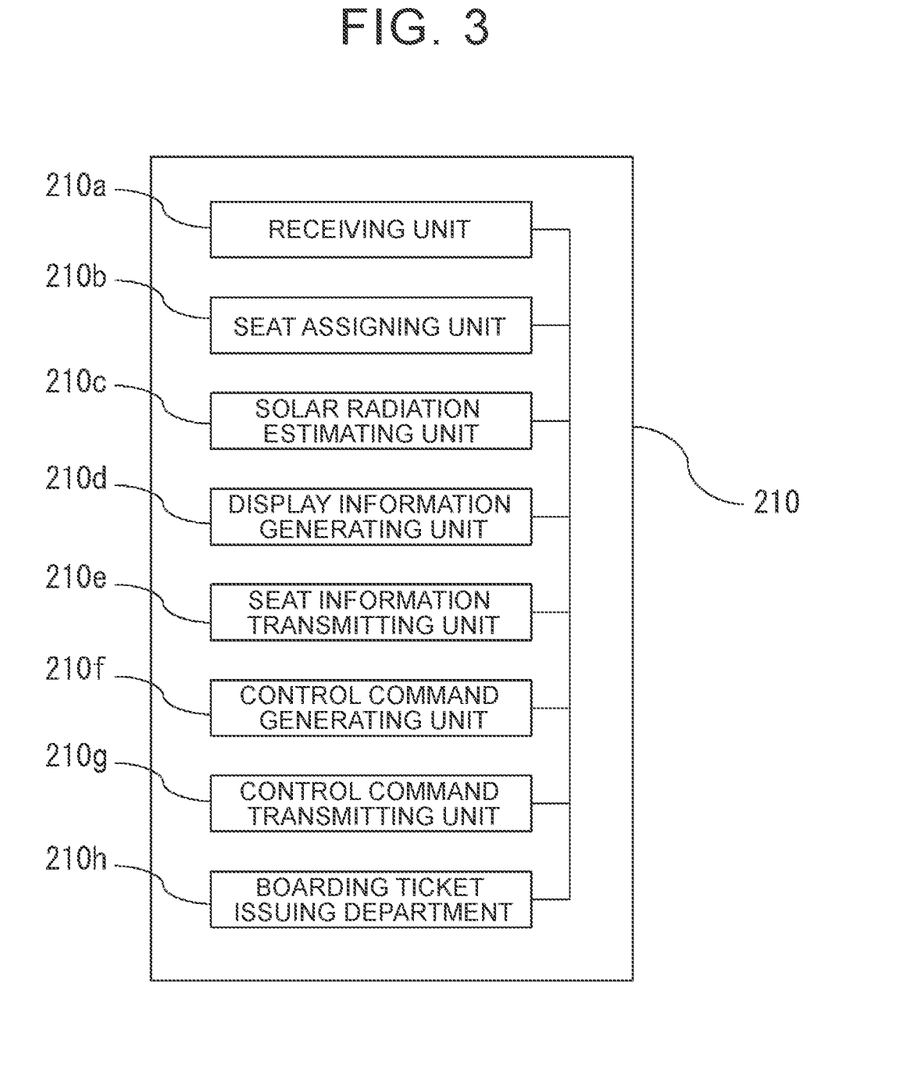
FIG. 3 is a schematic diagram showing a functional block of the control unit provided on the server.

FIG. 3 is a schematic diagram showing a functional block of the control unit 210 provided on the server 200. The control unit 210 of the server 200 includes a receiving unit 210*a*, a seat assigning unit 210*b*, a solar radiation estimating unit 210*c*, a display information generating unit 210*d*, a seat information transmitting unit 210*e*, a control command generating unit 210*f*, a control command transmitting unit 210*g*, and a boarding ticket issuing unit 210*h*. Each of these units included in the control unit 210 is, for example, a functional module realized by a computer program operating on the control unit 210. That is, each of these units included in the control unit 210 is composed of the control unit 210 and a program (software) for operating the control unit 210. Further, the program may be recorded in the storage unit 230 of the server 200 or a recording medium connected from the outside. Alternatively, each of these units included in the control unit 210 may be a dedicated arithmetic circuit provided in the control unit 210.

Receiving unit 210*a* of the control unit 210 receives via a communication I/F 220 a request regarding the properties of the seat transmitted from the terminal 300 of the passenger. Further, the receiving unit 210*a* receives information necessary for purchasing the ticket transmitted from the terminal 300 of the passenger. Characteristics of the seat include temperature around the seat, quietness, vibration, brightness or color of the lighting, brightness or color of the display provided in the seat, per day, and/or smell.

The seat assigning unit 210*b* of the control unit 210 assigns a seat to the passenger for each region in the room of the mobile body 100 based on a request regarding the characteristics of the seat received from the terminal 300 of the passenger. The seat assigning unit 210*b* of the control unit 210 assigns passengers having the same request to the same region. The seat assigning unit 210*b* is previously partitioned the region of the vehicle cabin of the mobile body 100 in accordance with the request of the expected passengers, may be assigned to the seats to the passengers for each region based on the received request. When the seat assigning unit 210*b* assigns a seat to each passenger, a seat number is assigned to each passenger. Therefore, a seat on which each passenger is seated is determined by the seat number.

In the case of a bus in which the mobile body 100 is driven by an engine, the engine is provided at the rear of the mobile body 100. Therefore, the seat assigning unit 210*b* may assign a seat other than the rear seat in the vehicle cabin to passengers requesting a quiet seat. Further, the region close to the position of the wheel in the vehicle cabin, noise and vibration may be larger than the other regions. Therefore, the seat assigning unit 210*b* may assign a seat away from the position of the wheel to a passenger requesting a quiet seat. Lower noise and vibration make it less likely to cause motion sickness. Therefore, the seat assigning unit 210*b* may assign a seat away from the position of the wheel to a passenger requesting a vehicle sickness-resistant seat. Also, in general, the rear seat tends to be more susceptible to motion sickness. Therefore, the seat assigning unit 210*b* may assign a front seat in the vehicle cabin to a passenger who desires a seat that is difficult to be sickly with a vehicle. In addition, when there is a seat reservation in the group, the seat assigning unit 210*b* may assign a seat away from the group to a passenger who desires a quiet seat. Further, the seat assigning unit 210*b* may learn a request regarding the characteristics of the seats of the individual passengers from a history of requests regarding the characteristics of the seats of the individual passengers, and assign the seats to the passengers based on the learning result.

Solar radiation estimating unit 210*c* of the control unit 210 estimates the orientation of the solar radiation with respect to the mobile body 100 from the operation path and the operation time of the mobile body 100. Specifically, the solar radiation estimating unit 210*c* includes a traveling direction of the mobile body 100 determined from the operation path, from the direction of the solar radiation corresponding to the operation time, to estimate whether the solar radiation hits from which direction with respect to the mobile body 100. The traveling direction of the mobile body 100 determined from the traveling route is, for example, a direction connecting the departure point and the destination of the mobile body 100 on the map. On the other hand, the traveling direction of the mobile body 100 determined from the traveling route may be the traveling direction of the mobile body 100 that changes every moment as the mobile body 100 travels according to the traveling route. Solar radiation estimating unit 210c obtains the traveling direction of the mobile body 100 at an arbitrary time from the operation path of the mobile body 100, may estimate the direction of solar radiation with respect to the mobile body 100 at an arbitrary time.

The seat assigning unit 210b, based on the request of the passenger about the day of the seat, and the direction of the solar radiation with respect to the mobile body 100 solar radiation estimating unit 210c is estimated, to assign a seat to the passenger. Specifically, the seat assigning unit 210b assigns a seat with less sunlight to a passenger who desires a seat with less sunlight, such as a passenger who wants to fall asleep, based on the direction of solar radiation with respect to the mobile body 100 estimated by the solar radiation estimating unit 210c. As a result, a passenger who wants to sleep can sleep more comfortably. In addition, since the seat assigning unit 210b wants to perform some kind of work on a seat such as a passenger who wants to read a book, a seat with less sunlight may be assigned to a passenger who desires a seat with less sunlight on the basis of the direction of solar radiation with respect to the mobile body 100 estimated by the solar radiation estimating unit 210c. As a result, it is possible to prevent the work in the seat from being hindered by solar radiation.

The display information generating unit 210d of the control unit 210 generates display information indicating the assignment of the seats for each region based on the assignment of the seats by the seat assigning unit 210b. Further, the display information generating unit 210d generates a display information indicating the direction of the solar radiation with respect to the mobile body 100 the solar radiation estimating unit 210c is estimated.

The seat information transmitting unit 210e of the control unit 210 transmits information related to the assigned seat to the terminal 300 of the passenger via the communication I/F 220. Specifically, the seat information transmitting unit 210e transmits, to the terminal 300 of the passenger, the number of the seat assigned to each passenger or the display information indicating the assignment of the seat for each region generated by the display information generating unit 210d. Further, the seat information transmitting unit 210e transmits display information indicating the direction of solar radiation generated by the display information generating unit 210d to the terminal 300 of the passenger. The seat information transmitting unit 210e also transmits these pieces of information to the mobile body 100.

Control command generating unit 210f of the control unit 210 generates a control command for controlling the characteristics of the seat for each region in response to a request regarding the characteristics of the seat. Specifically, the control command generating unit 210f, so as to meet the request regarding the characteristics of the seats of the passenger, the temperature of the vehicle cabin, the brightness of the lighting in the vehicle cabin, the color of the illumination, the type and volume of the voice, the brightness and color tone of the display, odor, the seat backrest to generate a control command for controlling such for each region. For example, the control command generating unit 210f is a control command for controlling the air conditioner 140, and a control command for lowering the temperature of the region R2 of FIG. 6 to be described later, to generate a control command for increasing the temperature of the region R3. Further, the control command generating unit 210f, in the region R1 of FIG. 6 to be described later, generates a control command for reclining the seat.

Control command generating unit 210f may generate a control command for performing the characterization of the lighting or voice in the vehicle cabin. For example, the control command generating unit 210f may activate the passenger during the commuting time, and may control lighting or sound so as to heal the passenger during the returning time. Characterization is done, for example, by tuning the BGM songs by sound, adjusting the voices of in-car broadcasts, changing the lighting and display brightness, adjusting the color, and changing the condition of the parts in contact with the body, such as the angle of the seat backrest. These are adapted to the needs of the passenger. This provides multi-modal interaction with passengers.

The control command transmitting unit 210g transmits the Control Directive generated by the control command generating unit 210f to the mobile body 100 via a communication I/F 220.

A control command for controlling the air conditioner 140 or a control command for controlling the in-vehicle environment adjusting device 150 is received by the communication device 120 of the mobile body 100. The control device 110 of the mobile body 100, based on these control commands, the air conditioner 140, controls the in-vehicle environment adjusting device 150.

The boarding ticket issuing unit 210h of the control unit 210 generates information representing the boarding ticket based on the information received from the terminal 300 of the passenger and necessary for the passenger to purchase the boarding ticket. The boarding ticket issuing unit 210h issues a ticket. The display information generating unit 210d generates display information for displaying information representing a ticket. The information representing the boarding ticket includes a boarding flight, a boarding location and a boarding time, a getting-off location and a scheduled getting-off time, and the like. The display information representing the ticket is transmitted to the passenger terminal 300.

Figure 4:
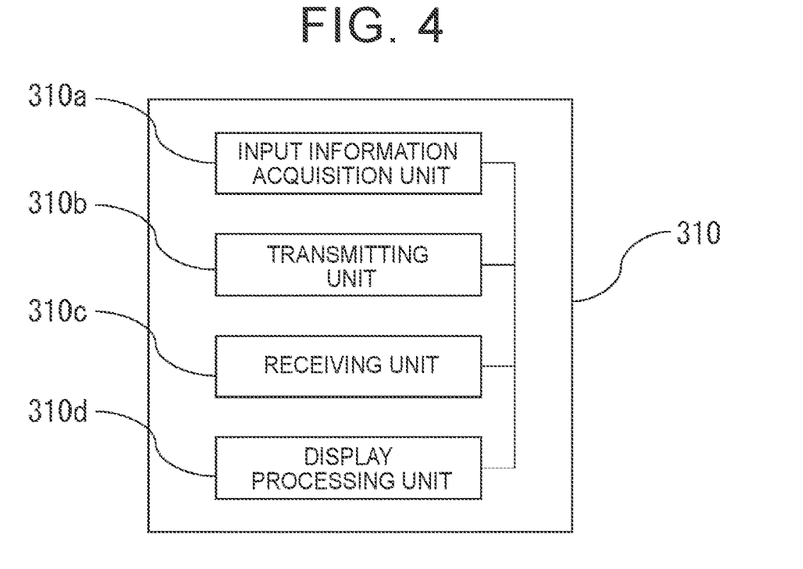
FIG. 4 is a schematic diagram showing a functional block of the control unit provided in the terminal.

FIG. 4 is a schematic diagram showing a functional block of the control unit 310 provided in the terminal 300. The control unit 310 of the terminal 300 includes an input information acquisition unit 310a, a transmitting unit 310b, a receiving unit 310c, and a display processing unit 310d. Each of these units included in the control unit 310 is, for example, a functional module realized by a computer program operating on the control unit 310. That is, each of these units included in the control unit 310 is composed of the control unit 310 and a program (software) for operating the control unit 310. Further, the program may be recorded in the storage unit 330 of the user terminal 300 or a recording medium connected from the outside. Alternatively, each of these units included in the control unit 310 may be a dedicated arithmetic circuit provided in the control unit 310.

The input information acquisition unit 310a of the control unit 310 of the terminal 300 acquires a request regarding the characteristics of the seat input by the passenger by operating the input unit 350. Requests regarding the characteristics of the seat include requests such as a desire to sit in a seat with air conditioning, a desire to sit in a seat with air conditioning, a desire to sit in a quiet seat, and a desire to speak in a seat. Further, the input information acquisition unit 310a acquires information necessary for the passenger to purchase the input ticket by operating the input unit 350. The information for purchasing the boarding ticket includes a name, a telephone number, an email address, information indicating the boarding service, a boarding location and a boarding time, a getting-off location and a getting-off scheduled time, information for settlement such as a credit card number, and the like.

The transmitting unit 310b of the control unit 310 performs a process of transmitting a request regarding the property of the seats to the server 200 via the communication I/F 320. In addition, the transmitting unit 310b performs a process of transmitting information required for purchasing a ticket to the server 200 via the communication I/F 320.

The receiving unit 310c of the control unit 310 performs a process of receiving, via the communication I/F 320, the display information indicating the number of the seat or the assignment of the seat for each region, which is transmitted from the server 200. In addition, the receiving unit 310c performs a process of receiving, via the communication I/F 320, display information indicating a ticket or display information indicating a direction of solar radiation transmitted from the server 200.

The display processing unit 310d of the control unit 310 performs processing for displaying, on the display unit 340, the number of the seat, the display information indicating the assignment of the seat, the display information indicating the boarding ticket, the display information indicating the direction of the solar radiation, and the like received from the server 200.

Figure 5:
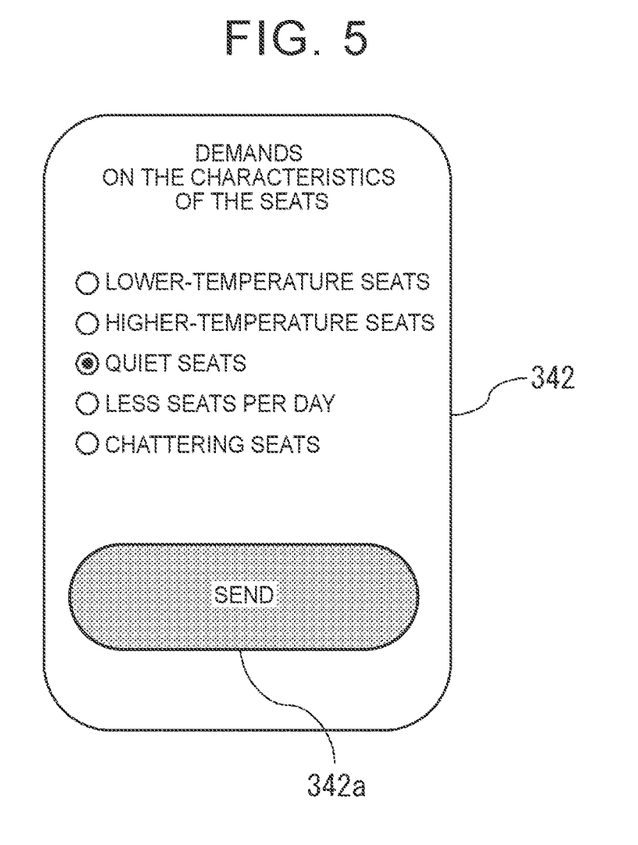
FIG. 5 is a schematic diagram showing an example of a display screen of the display unit when the terminal is a smartphone and the display unit of the terminal is composed of a touch panel.

FIG. 5 is a schematic diagram illustrating an example of the display screen 342 of the display unit 340 when the terminal 300 is a smartphone and the display unit 340 of the terminal 300 is configured of a touch panel. In the example shown in FIG. 5, a screen for inputting a request regarding the characteristics of a seat is shown, and as a request regarding the characteristics of a seat, a request of a passenger can be selected from among "a seat with a lower temperature," "a seat with a higher temperature," "a quiet seat," "a seat with less per day," and "a seat capable of talking." The display screen 342 shows a state in which the passenger has selected "quiet seat".

After the passenger selects "quiet seat", when the passenger presses the transmission button 342a, "quiet seat" is input to the input unit 350 as a request regarding the characteristics of the seat in accordance with the operation of the passenger. The request is acquired by the input information acquisition unit 310a. This request is transmitted to the server 200 by the transmitting unit 310b. Although a screen for selecting a request is illustrated in FIG. 5, the request of the passenger may be individually input.

Note that a screen for transmitting a request regarding the characteristics of the seat as illustrated in FIG. 5 may be displayed when the passenger authenticates the passenger's boarding of the mobile body 100. More specifically, a screen for transmitting a request regarding a characteristic of a seat may be displayed when purchasing a ticket, and may be displayed, for example, after a settlement is completed when purchasing a ticket. When a request regarding the characteristics of the seat is transmitted to the server 200, the number of the seat, the display information indicating the assignment of the seat, the display information indicating the direction of the solar radiation, the display information indicating the ticket, and the like are transmitted from the server 200 to the terminal 300 of the passenger before the passenger rides on the mobile body 100. Accordingly, the passenger can recognize these information in advance before getting on the mobile body 100.

The desire for the characteristics of the seat shown in FIG. 5 is an example, in addition to the desire for the characteristics of the seat shown in FIG. 5, it may include "a seat with a bright illumination," "a seat with a dark illumination," "a seat with less sickness," "a seat with less relaxation," and the like. Requests regarding the characteristics of the seat may also relate to the color of the illumination, the brightness or color of the display, the odor, and the difficulty of motion sickness. In a case where the request regarding the characteristics of the seat is a seat that is less susceptible to motion sickness, the input information acquisition unit 310a can determine that the request regarding the seat is a quiet seat, a seat with less vibration, or a seat on the front side of the vehicle cabin.

Figure 6:
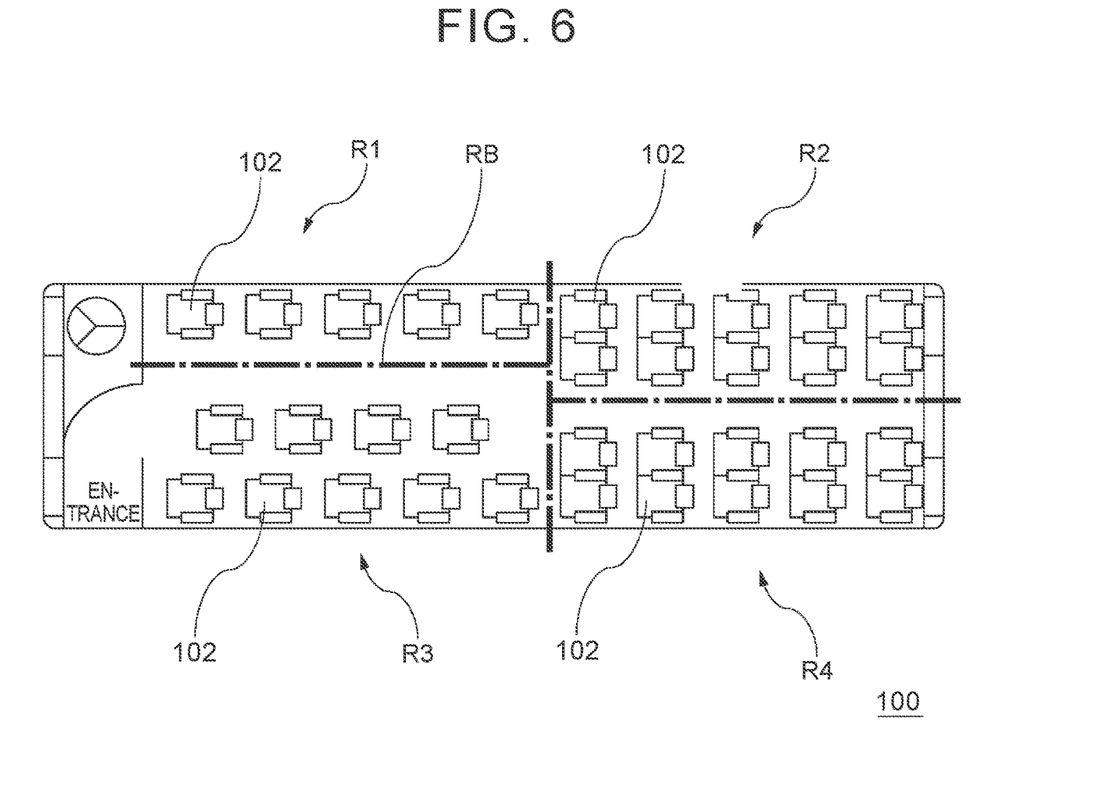
FIG. 6 is a schematic diagram illustrating an example of assignment of a seat by a seat assigning unit.

FIG. 6 is a schematic diagram illustrating an example of assignment of seats by the seat assigning unit 210b. In the example illustrated in FIG. 6, the vehicle cabin of the mobile body 100 is partitioned into four regions: a quiet region R1, a region R2 having a relatively low temperature, a region R3 having a higher temperature than the region R2, and a region R4 capable of speaking. The seat assigning unit 210b assigns passengers having a common request to the same region based on the request regarding the characteristics of the seats received from the terminal 300 of each passenger. The seat assigning unit 210b assigns each passenger to one of the seats in the regions R1 to R4.

Regions R1-R4 shown in FIG. 6 may be partitioned by other factors such as vibration, illumination brightness or color, display brightness or color provided in the seat, per day, or odor. For example, the region R1 may be a small region per day, the region R2 may be a dark region of illumination, the region R3 may be a region of illumination of a specific color (e.g., white, yellow, or blue), and the region R4 may be a region of a specific odor.

Also, one of the regions R1-R4 may be a region that heals passengers. A passenger who has transmitted a "relaxable seat" as a request regarding the characteristics of the seat may be assigned to a region to heal the passenger. In the region to heal the passenger, the brightness or color of the illumination and the brightness or color of the display are rendered suitable for healing, and the BGM suitable for healing flows and is rendered suitable for healing. Similarly, one of the regions R1-R4 may be a region that activates a passenger. The regions that activate passengers are the illumination color, display color, BGM, and odor suitable for them.

The boundaries RB of the regions R1 to R4 are preferably partitioned by partitions, curtains, or the like. As a result, the movement of heat, sound, light, and odor between the regions is suppressed, and thus these are accurately adjusted for each region.

Figure 7:
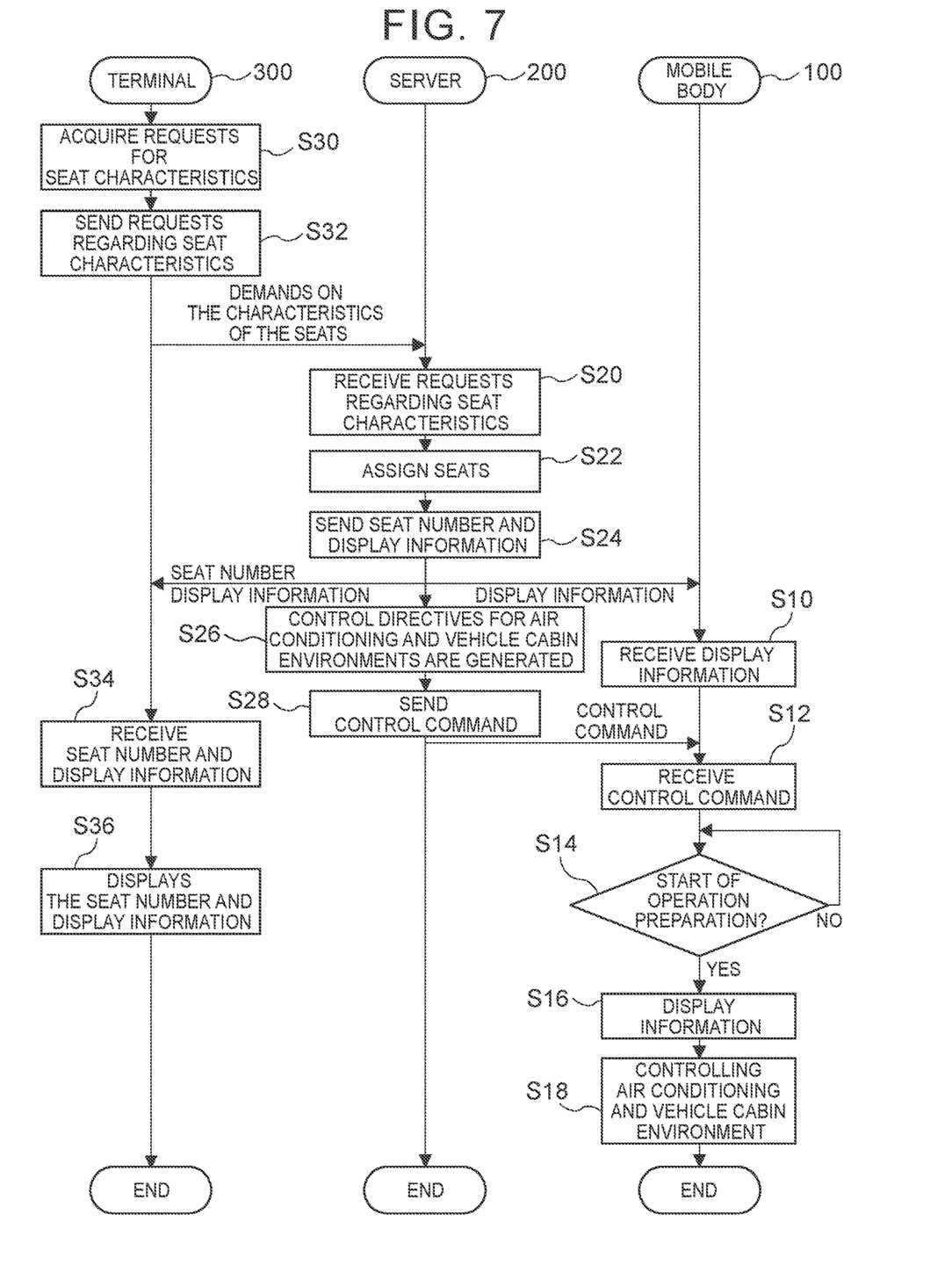
FIG. 7 is a sequence diagram illustrating processing performed by a mobile body, a server, and a passenger terminal.

FIG. 7 is a sequence diagram illustrating processing performed by the mobile body 100, the server 200, and the passenger terminal 300. Processing shown in FIG. 7, the control device 110 of the mobile body 100, the control unit 210 of the server 200, and is performed by the control unit 310 of the terminal 300 of the passenger.

First, the input information acquisition unit 310a of the control unit 310 of the terminal 300 acquires a request regarding the characteristics of the seat input by the passenger by operating the input unit 350 (step S30). Next, the transmitting unit 310b of the control unit 310 of the terminal 300 transmits a request regarding the property of the seats to the server 200 via the communication I/F 320 (step S32).

Next, the receiving unit 210a of the control unit 210 of the server 200 receives the request regarding the property of the seat transmitted from the terminal 300 of the passenger via the communication I/F 220 (step S20). Next, the seat assigning unit 210b of the control unit 210 of the server 200 assigns a seat to each passenger for each region in the vehicle cabin based on a request regarding the characteristics of the seat, and assigns the passengers having the same request to the same region (step S22).

Next, the seat information transmitting unit 210e of the control unit 210 of the server 200 transmits, to the terminal 300 of the passenger via the communication I/F 220, the display information indicating the number of the seat assigned by the seat assigning unit 210b and the assignment of the seat generated by the display information generating unit 210d (step S24). In step S24, the seat information transmitting unit 210e transmits display information indicating the assignment of the seat generated by the display information generating unit 210d to the mobile body 100.

Next, in the terminal 300, the receiving unit 310c of the control unit 310 receives, via the communication I/F 320, the display information indicating the assignment of the seat number and the seat number transmitted from the server 200 (step S34). Further, in the mobile body 100, the communication device 120 receives the display information transmitted from the server 200 (Step S10).

Next, in the terminal 300, the display processing unit 310d of the control unit 310 displays, on the display unit 340, display information indicating the number of the seat and the assignment of the seat received from the server 200 (step S36). After step S36, the processing of the control unit 310 of the terminal 300 ends.

In the server 200, after step S24, the control command generating unit 210f of the control unit 210, the air conditioner 140 of the mobile body 100, generates a control command for controlling the in-vehicle environment adjusting device 150 (step S26). Next, the control command transmitting unit 210g of the control unit 210 transmits these control commands to the mobile body 100 (step S28). After step S28, the processing of the control unit 210 of the server 200 ends.

Next, the communication device 120 of the mobile body 100 receives a control command transmitted from the server 200 (step S12). Next, it is determined whether or not preparation for operation of the mobile body 100 is started (step S14). When the preparation for the operation is started, the control device 110 of the mobile body 100 causes the display to display the display information indicating the assignment of the seat received from the server 200. Next, the control device 110 of the mobile body 100, based on a control command, the air conditioner 140, and controls the in-vehicle environment adjusting device 150 (step S18). After step S18, the processing of the control device 110 of the mobile body 100 ends.

As described above, according to the present embodiment, a passenger having a common demand is assigned to the same region based on a demand regarding the characteristics of the passenger's seat. Thus, a desire for the characteristics of the seats of the individual passengers is realized. As a result, the characteristics of the seat are matched with the passenger's desire, and the occurrence of a sense of discomfort in the passenger is reduced. Therefore, comfortable movement of the passenger is realized. In addition, an optimum environment for each passenger can be realized while taking advantage of the difference in environment depending on the seat position. Therefore, the passenger can move in a relaxed manner, and the stress of the passenger is eliminated.

What is claimed is:

1. A seat management server device comprising:
   a receiver that receives a request regarding a characteristic of sunniness of a requested seat of a mobile body that a first passenger is able to board with one or more second passengers, wherein the request being transmitted from a terminal of the first passenger;
   wherein the one or more second passengers make the same request as the first passenger;
   a seat assigner that assigns an assigned seat to the first passenger in a first region in a cabin of the mobile body based on the request, and assigns the one or more second passengers to the first region;
   a control command transmitter that transmits, to the mobile body, a control command for controlling the characteristic of the assigned seat in response to the request, wherein the control command sets the characteristic of each seat for each of the regions of the mobile body;
   wherein the control command controls a lighting device or a reclining device of the assigned seat of the mobile body; and
   a solar radiation estimator that estimates a direction of solar radiation with respect to the mobile body from an operation route and an operation time of the mobile body, wherein the seat assigner assigns the assigned seat to the first passenger based on the request regarding the characteristic of sunniness of the requested seat and the direction of the solar radiation with respect to the mobile body that is estimated by the solar radiation estimator.

2. The seat management server device according to claim 1, further comprising a seat information transmitter that transmits information regarding the assigned seat to the terminal of the first passenger or the mobile body.

3. The seat management server device according to claim 2, further comprising a display information generator that generates display information showing a seat assignment for each of the regions, wherein the seat information transmitter transmits the display information.

4. The seat management server device according to claim 1, wherein the characteristic of the requested seat further includes at least one of a temperature around the seat, a silence, a vibration, a brightness or a color of a light, a brightness or a color of a display device provided for the seat and an odor.

5. A seat management method comprising:
   a step of receiving, by a server, a request regarding a characteristic of sunniness of a requested seat of a mobile body that a first passenger is able to board with one or more second passengers, the request being transmitted from a terminal of the first passenger;
   wherein the one or more second passengers make the same request as the first passenger;
   a step of assigning, by the server, an assigned seat to the first passenger in a first region in a cabin of the mobile body based on the request, and the server assigns the one or more second passengers to the first region;
   a step of transmitting, by the server, to the mobile body, a control command for controlling the characteristic of the assigned seat in response to the request, wherein the control command sets the characteristic of each seat for each of the regions of the mobile body;
   wherein the control command controls a lighting device or a reclining device of the assigned seat of the mobile body; and
   a step of estimating, by the server, a direction of solar radiation with respect to the mobile body from an operation route and an operation time of the mobile body, wherein the step of assigning the assigned seat assigns the assigned seat to the first passenger based on the request regarding the characteristic of sunniness of the requested seat and the direction of the solar radiation with respect to the mobile body that is estimated.

6. A seat management system in which a terminal of a first passenger and a seat management server device are communicably connected to each other, the seat management system comprising:

the seat management server device including
a receiver that receives a request regarding a characteristic of sunniness of a requested seat of a mobile body that the first passenger is able to board with one or more second passengers, the request being transmitted from the terminal,
wherein the one or more second passengers make the same request as the first passenger;
a seat assigner that assigns an assigned seat to the first passenger in a first region in a cabin of the mobile body based on the request, and assigns the second passengers to the first region,
a control command transmitter that transmits, to the mobile body, a control command for controlling the characteristic of the assigned seat in response to the request, wherein the control command sets the characteristic of each seat for each of the regions of the mobile body, wherein the control command controls a lighting device or a reclining device of the assigned seat of the mobile body;
a seat information transmitter that transmits information regarding the assigned seat to the terminal, and
a solar radiation estimator that estimates a direction of solar radiation with respect to the mobile body from an operation route and an operation time of the mobile body, wherein the seat assigner assigns the assigned seat to the first passenger based on the request regarding the characteristic of sunniness of the requested seat and the direction of the solar radiation with respect to the mobile body that is estimated by the solar radiation estimator; and
the terminal provided with a receiver that receives the information regarding the assigned seat.

* * * * *